US011137050B2

(12) United States Patent
    Etchason (10) Patent No.: US 11,137,050 B2
(45) Date of Patent:     Oct. 5, 2021

(54) TRANSMISSION MULTI-SPEED ADDER

(71) Applicant: ALLISON TRANSMISSION, INC., Indianapolis, IN (US)

(72) Inventor: Edmond M. Etchason, New Palestine (IN)

(73) Assignee: ALLISON TRANSMISSION, INC., Indianapolis, IN (US)

(*) Notice: Subject to any disclaimer, the term of this patent is extended or adjusted under 35 U.S.C. 154(b) by 0 days.

(21) Appl. No.: 16/884,127

(22) Filed: May 27, 2020

(65) Prior Publication Data

US 2020/0378475 A1     Dec. 3, 2020

Related U.S. Application Data

(60) Provisional application No. 62/921,014, filed on May 28, 2019.

(51) Int. Cl.
    *F16H 3/66*     (2006.01)

(52) U.S. Cl.
    CPC ......... *F16H 3/66* (2013.01); *F16H 2200/006* (2013.01); *F16H 2200/0056* (2013.01); *F16H 2200/0065* (2013.01); *F16H 2200/0086* (2013.01); *F16H 2200/0091* (2013.01); *F16H 2200/0095* (2013.01); *F16H 2200/201* (2013.01); *F16H 2200/2007* (2013.01); *F16H 2200/2041* (2013.01); *F16H 2200/2043* (2013.01)

(58) Field of Classification Search
    CPC ..... F16H 2200/0065; F16H 2200/0095; F16H 3/66; F16H 2200/0091; F16H 2200/2007; F16H 2200/2041; F16H 2200/2043; F16H 2200/2046
    See application file for complete search history.

(56) References Cited

U.S. PATENT DOCUMENTS

| | | |
|---|---|---|
| 4,070,927 A | 1/1978 | Polak |
| 4,233,861 A | 11/1980 | Gaus et al. |
| 5,030,186 A | 7/1991 | Asada |
| 5,049,116 A | 9/1991 | Asada |
| 5,057,063 A | 10/1991 | Asada et al. |
| 5,098,357 A | 3/1992 | Asada et al. |
| 5,800,304 A | 9/1998 | Beim et al. |

(Continued)

OTHER PUBLICATIONS

"Short Cuts for Analyzing Planetary Gearsets" by Ferguson (Year: 1983).*

*Primary Examiner* — Stacey A Fluhart
(74) *Attorney, Agent, or Firm* — Taft Stettinius & Hollister LLP; Stephen F. Rost (57) ABSTRACT

A multiple speed transmission includes an input shaft, an output shaft, a first planetary gearset having a first member, a second member, and a third member, and a second planetary gearset having a first member, a reaction member, a second member, and a third member. The transmission also includes a plurality of interconnecting members each connected between at least one of the first and second planetary gearsets and at least another of the first and second planetary gearsets. The transmission includes a plurality of torque-transmitting mechanisms which are selectively engageable in combinations of at least two to establish between seven and nine forward speed ratios and between two and four reverse speed ratios between the input shaft and the output shaft.

20 Claims, 4 Drawing Sheets

(56) References Cited

U.S. PATENT DOCUMENTS

| | | | |
|---|---|---|---|
| 6,083,135 | A | 7/2000 | Baldwin et al. |
| 6,743,141 | B2 | 6/2004 | Bucknor et al. |
| 6,932,735 | B2 | 8/2005 | Kao et al. |
| 7,549,942 | B2 | 6/2009 | Gumpoltsberger |
| 8,113,983 | B2 | 2/2012 | Gumpoltsberger |
| 8,131,435 | B2* | 3/2012 | Ivacko ................ F16H 61/0437 |
| | | | 701/50 |
| 9,568,069 | B2 | 2/2017 | Beck et al. |
| 2007/0238573 | A1 | 10/2007 | Kamm et al. |
| 2007/0275815 | A1* | 11/2007 | Raghavan ................ F16H 3/663 |
| | | | 475/276 |
| 2008/0015077 | A1 | 1/2008 | Kamm et al. |
| 2008/0234093 | A1 | 9/2008 | Diosi et al. |
| 2011/0300987 | A1 | 12/2011 | Diosi et al. |
| 2015/0133258 | A1 | 5/2015 | Beck et al. |
| 2018/0112747 | A1* | 4/2018 | Warth ..................... F16H 3/663 |
| 2018/0202518 | A1* | 7/2018 | Dersjo ...................... F16H 3/66 |
| 2020/0370623 | A1* | 11/2020 | Na .......................... F16H 3/663 |

\* cited by examiner

TRANSMISSION MULTI-SPEED ADDER

RELATED DISCLOSURES

This application claims the benefit of U.S. Provisional Patent Application Ser. No. 62/921,014, filed May 28, 2019, the disclosure of which is hereby incorporated by reference in its entirety.

FIELD OF THE DISCLOSURE

The present disclosure relates to a multiple speed transmission, and in particular to a multiple speed transmission capable of achieving multiple forward and reverse ranges or speeds.

BACKGROUND

Multiple speed transmissions use a number of friction clutches or brakes, planetary gearsets, shafts, and other elements to achieve a plurality of gear or speed ratios. The architecture, i.e., packaging or layout of the aforementioned elements, is determined based on cost, size, packaging constraints, and desired ratios. There is a need for new architectural designs of multiple speed transmissions for achieving different ratios with improved performance, cost, efficiency, responsiveness, and packaging.

SUMMARY

In a first embodiment of the present disclosure, a multiple speed transmission, includes an input shaft; an output shaft; a first planetary gearset having a first member, a second member, and a third member; a second planetary gearset having a first member, a reaction member, a second member, and a third member; a plurality of interconnecting members each connected between at least one of the first and second planetary gearsets and at least another of the first and second planetary gearsets; a first torque-transmitting mechanism selectively engageable to interconnect the input shaft with the first member of the first planetary gearset; a second torque-transmitting mechanism selectively engageable to interconnect the input shaft with the third member of the first planetary gearset and the second member of the second planetary gearset; a third torque-transmitting mechanism selectively engageable to interconnect the third member of the first planetary gearset and the second member of the second planetary gearset with a stationary member; a fourth torque-transmitting mechanism selectively engageable to interconnect the third member of the second planetary gearset with the stationary member; and a fifth torque-transmitting mechanism selectively engageable to interconnect the reaction member of the second planetary gearset with the stationary member; wherein the torque transmitting mechanisms are selectively engageable in combinations of at least two to establish at least nine forward speed ratios and at least four reverse speed ratios between the input shaft and the output shaft.

In one example of this embodiment, the output shaft is continuously interconnected with the second member of the first planetary gearset and the first member of the second planetary gearset. In a second example, the plurality of interconnecting members includes a first interconnecting member directly connected to the first member of the first planetary gearset. In a third example, the plurality of interconnecting members includes a second interconnecting member continuously interconnecting the third member of the first planetary gearset with the second member of the second planetary gearset.

In a fourth example, the plurality of interconnecting members includes a third interconnecting member directly connected to the third member of the second planetary gearset. In a fifth example, the plurality of interconnecting members includes a fourth interconnecting member directly connected to the reaction member of the second planetary gearset. In a sixth example, the second member of the second planetary gearset comprises a first set of pinion gears and a second set of pinion gears meshing with each other, the first set of pinion gears meshing with the first member of the second planetary gearset and the second set of pinion gears meshing with the third member of the second planetary gearset and the reaction member of the second planetary gearset. In a seventh example, the first set of pinion gears comprises long pinion gears and the second set of pinion gears comprises short pinion gears.

In an eighth example, the first planetary gearset is disposed within a transmission housing and the second planetary gearset is disposed within an add-on housing, the add-on housing being mounted to the transmission housing. In a ninth example, the first member of the first planetary gearset comprises an input to the first planetary gearset and the second member of the first planetary gearset comprises an output of the first planetary gearset; the first member of the second planetary gearset comprises an input to the second planetary gearset and the second member of the second planetary gearset comprises an output of the second planetary gearset; the output of the second planetary gearset is connected to the third member of the first planetary gearset to form a second input to the first planetary gearset.

In a tenth example of this embodiment, the first members of the first and second planetary gearsets and the reaction member of the second planetary gearset comprise sun gears; the second member of the first and second planetary gearsets comprise carrier members; and the third members of the first and second planetary gearsets comprise ring gears.

In another embodiment of the present disclosure, a multiple speed transmission, includes an input shaft; an output shaft; a first planetary gearset having a first member, a second member, and a third member; a second planetary gearset having a first member, a reaction member, and a second member; a plurality of interconnecting members each connected between at least one of the first and second planetary gearsets and at least another of the first and second planetary gearsets; a first torque-transmitting mechanism selectively engageable to interconnect the input shaft with the first member of the first planetary gearset; a second torque-transmitting mechanism selectively engageable to interconnect the input shaft with the third member of the first planetary gearset and the second member of the second planetary gearset; a third torque-transmitting mechanism selectively engageable to interconnect the third member of the first planetary gearset and the second member of the second planetary gearset with a stationary member; and a fourth torque-transmitting mechanism selectively engageable to interconnect the reaction member of the second planetary gearset with the stationary member; wherein the torque transmitting mechanisms are selectively engageable in combinations of at least two to establish at least eight forward speed ratios and at least two reverse speed ratios between the input shaft and the output shaft.

In a first example of this embodiment, the first members of the first and second planetary gearsets and the reaction member of the second planetary gearset comprise sun gears;

the second member of the first and second planetary gearsets comprise carrier members; and the third member of the first planetary gearset comprises a ring gear.

In a second example, the output shaft is continuously interconnected with the second member of the first planetary gearset and the first member of the second planetary gearset; the plurality of interconnecting members includes a first interconnecting member directly connected to the first member of the first planetary gearset; the plurality of interconnecting members includes a second interconnecting member continuously interconnecting the third member of the first planetary gearset with the second member of the second planetary gearset; and the plurality of interconnecting members includes a third interconnecting member directly connected to the reaction member of the second planetary gearset.

In a third example, the second member of the second planetary gearset comprises a first set of pinion gears and a second set of pinion gears meshing with one another, the first set of pinion gears meshing with the first member of the second planetary gearset and the second set of pinion gears meshing with the reaction member of the second planetary gearset. In another example, the first member of the first planetary gearset comprises an input to the first planetary gearset and the second member of the first planetary gearset comprises an output of the first planetary gearset; the first member of the second planetary gearset comprises an input to the second planetary gearset and the second member of the second planetary gearset comprises an output of the second planetary gearset; the output of the second planetary gearset is connected to the third member of the first planetary gearset to form a second input to the first planetary gearset.

In a further embodiment of the present disclosure, a multiple speed transmission, includes an input shaft; an output shaft; a first planetary gearset having a first member, a second member, and a third member, wherein the first planetary gearset is a simple planetary gearset; a second planetary gearset having a first member, a second member, and a third member, wherein the second planetary gearset is a compound planetary gearset; a plurality of interconnecting members each connected between at least one of the first and second planetary gearsets and at least another of the first and second planetary gearsets; a first torque-transmitting mechanism selectively engageable to interconnect the input shaft with the first member of the first planetary gearset; a second torque-transmitting mechanism selectively engageable to interconnect the input shaft with the third member of the first planetary gearset and the second member of the second planetary gearset; a third torque-transmitting mechanism selectively engageable to interconnect the third member of the first planetary gearset and the second member of the second planetary gearset with a stationary member; and a fourth torque-transmitting mechanism selectively engageable to interconnect the third member of the second planetary gearset with the stationary member; wherein the torque transmitting mechanisms are selectively engageable in combinations of at least two to establish at least seven forward speed ratios and at least three reverse speed ratios between the input shaft and the output shaft.

In one example of this embodiment, the first members of the first and second planetary gearsets comprise sun gears; the second member of the first and second planetary gearsets comprise carrier members; and the third members of the first and second planetary gearsets comprise ring gears.

In another example, the output shaft is continuously interconnected with the second member of the first planetary gearset and the first member of the second planetary gearset; the plurality of interconnecting members includes a first interconnecting member directly connected to the first member of the first planetary gearset; the plurality of interconnecting members includes a second interconnecting member continuously interconnecting the third member of the first planetary gearset with the second member of the second planetary gearset; and the plurality of interconnecting members includes a third interconnecting member directly connected to the third member of the second planetary gearset.

In a further example, the second member of the second planetary gearset comprises a first set of pinion gears and a second set of pinion gears, the first set of pinion gears meshing with the first member of the second planetary gearset and the second set of pinion gears meshing with the reaction member of the second planetary gearset.

BRIEF DESCRIPTION OF THE DRAWINGS

The above-mentioned aspects of the present disclosure and the manner of obtaining them will become more apparent and the disclosure itself will be better understood by reference to the following description of the embodiments of the disclosure, taken in conjunction with the accompanying drawings, wherein.

Corresponding reference numerals are used to indicate corresponding parts throughout the several views.

DETAILED DESCRIPTION

The embodiments of the present disclosure described below are not intended to be exhaustive or to limit the disclosure to the precise forms disclosed in the following detailed description. Rather, the embodiments are chosen and described so that others skilled in the art may appreciate and understand the principles and practices of the present disclosure.

Figure 1:
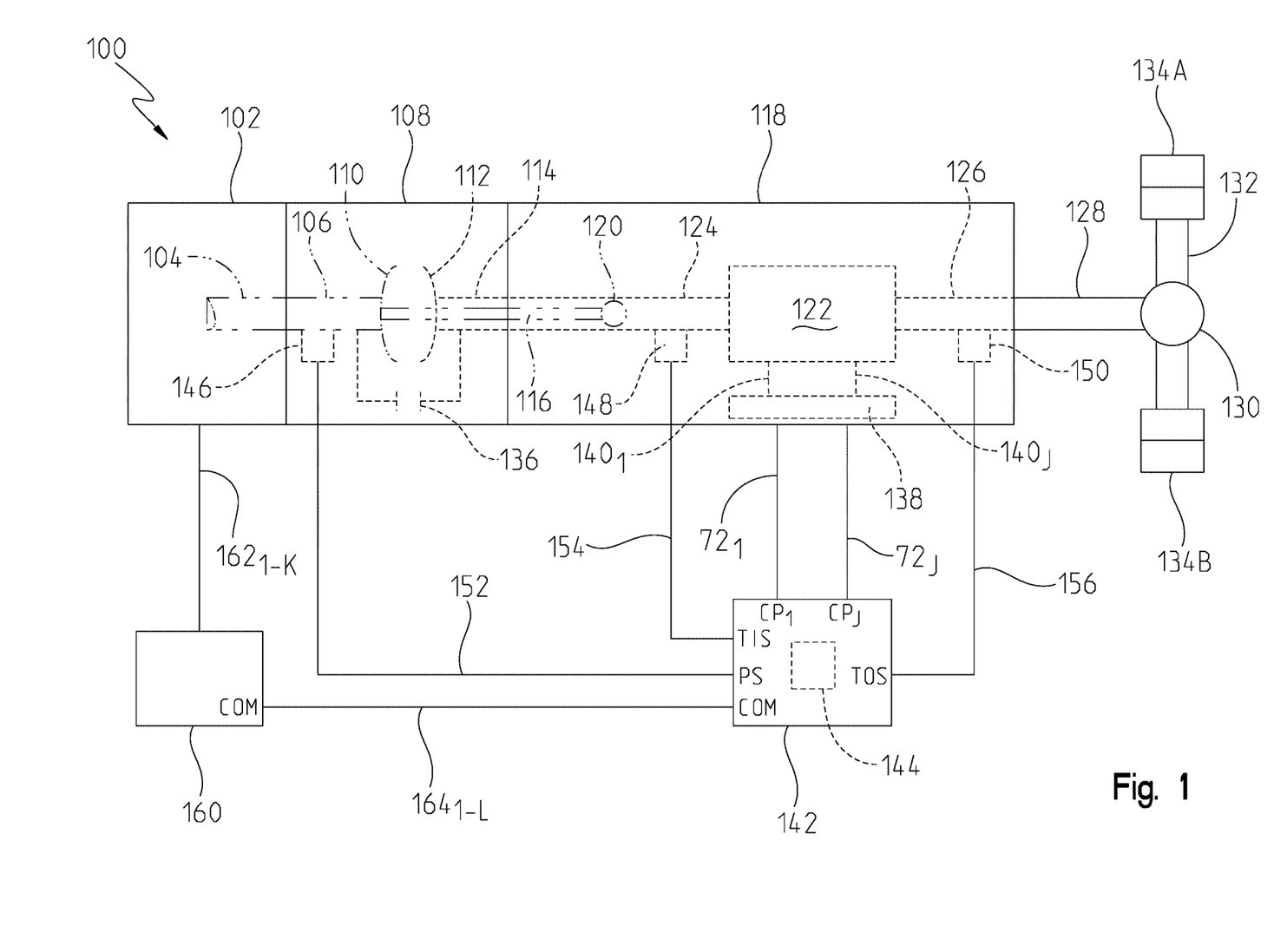
FIG. 1 is an exemplary block diagram and schematic view of one illustrative embodiment of a powered vehicular system.

Referring now to FIG. 1, a block diagram and schematic view of one illustrative embodiment of a vehicular system 100 having a drive unit 102 and transmission 118 is shown. In the illustrated embodiment, the drive unit 102 may include an internal combustion engine, diesel engine, electric motor, or other power-generating device. The drive unit 102 is configured to rotatably drive an output shaft 104 that is coupled to an input or pump shaft 106 of a conventional torque converter 108. The input or pump shaft 106 is coupled to an impeller or pump 110 that is rotatably driven by the output shaft 104 of the drive unit 102. The torque converter 108 further includes a turbine 112 that is coupled to a turbine shaft 114, and the turbine shaft 114 is coupled to, or integral with, a rotatable input shaft 124 of the transmission 118. The transmission 118 can also include an internal pump 120 for building pressure within different flow circuits (e.g., main circuit, lube circuit, etc.) of the transmission 118. The pump 120 can be driven by a shaft 116 that is coupled to the output shaft 104 of the drive unit 102. In this arrangement, the drive unit 102 can deliver torque to the shaft 116 for driving the pump 120 and building pressure within the different circuits of the transmission 118.

The transmission 118 can include a planetary gear system 122 having a number of automatically selected gears. An output shaft 126 of the transmission 118 is coupled to or integral with, and rotatably drives, a propeller shaft 128 that is coupled to a conventional universal joint 130. The universal joint 130 is coupled to, and rotatably drives, an axle 132 having wheels 134A and 134B mounted thereto at each end. The output shaft 126 of the transmission 118 drives the wheels 134A and 134B in a conventional manner via the propeller shaft 128, universal joint 130 and axle 132.

A conventional lockup clutch 136 is connected between the pump 110 and the turbine 112 of the torque converter 108. The operation of the torque converter 108 is conventional in that the torque converter 108 is operable in a so-called "torque converter" mode during certain operating conditions such as vehicle launch, low speed and certain gear shifting conditions. In the torque converter mode, the lockup clutch 136 is disengaged and the pump 110 rotates at the rotational speed of the drive unit output shaft 104 while the turbine 112 is rotatably actuated by the pump 110 through a fluid (not shown) interposed between the pump 110 and the turbine 112. In this operational mode, torque multiplication occurs through the fluid coupling such that the turbine shaft 114 is exposed to drive more torque than is being supplied by the drive unit 102, as is known in the art. The torque converter 108 is alternatively operable in a so-called "lockup" mode during other operating conditions, such as when certain gears of the planetary gear system 122 of the transmission 118 are engaged. In the lockup mode, the lockup clutch 136 is engaged and the pump 110 is thereby secured directly to the turbine 112 so that the drive unit output shaft 104 is directly coupled to the input shaft 124 of the transmission 118, as is also known in the art.

The transmission 118 further includes an electro-hydraulic system 138 that is fluidly coupled to the planetary gear system 122 via a number, J, of fluid paths, $140_1$-$140_J$, where J may be any positive integer. The electro-hydraulic system 138 is responsive to control signals to selectively cause fluid to flow through one or more of the fluid paths, $140_1$-$140_J$, to thereby control operation, i.e., engagement and disengagement, of a plurality of corresponding friction devices in the planetary gear system 122. The plurality of friction devices may include, but are not limited to, one or more conventional brake devices, one or more torque transmitting devices, and the like. Generally, the operation, i.e., engagement and disengagement, of the plurality of friction devices is controlled by selectively controlling the friction applied by each of the plurality of friction devices, such as by controlling fluid pressure to each of the friction devices. In one example embodiment, which is not intended to be limiting in any way, the plurality of friction devices include a plurality of brake and torque transmitting devices in the form of conventional clutches that may each be controllably engaged and disengaged via fluid pressure supplied by the electro-hydraulic system 138. In any case, changing or shifting between the various gears of the transmission 118 is accomplished in a conventional manner by selectively controlling the plurality of friction devices via control of fluid pressure within the number of fluid paths $140_1$-$140_J$.

The system 100 further includes a transmission control circuit 142 that can include a memory unit 144. The transmission control circuit 142 is illustratively microprocessor-based, and the memory unit 144 generally includes instructions stored therein that are executable by a processor of the transmission control circuit 142 to control operation of the torque converter 108 and operation of the transmission 118, i.e., shifting between the various gears of the planetary gear system 122. It will be understood, however, that this disclosure contemplates other embodiments in which the transmission control circuit 142 is not microprocessor-based, but is configured to control operation of the torque converter 108 and/or transmission 118 based on one or more sets of hardwired instructions and/or software instructions stored in the memory unit 144.

In the system 100 illustrated in FIG. 1, the torque converter 108 and the transmission 118 include a number of sensors configured to produce sensor signals that are indicative of one or more operating states of the torque converter 108 and transmission 118, respectively. For example, the torque converter 108 illustratively includes a conventional speed sensor 146 that is positioned and configured to produce a speed signal corresponding to the rotational speed of the pump shaft 106, which is the same rotational speed of the output shaft 104 of the drive unit 102. The speed sensor 146 is electrically connected to a pump speed input, PS, of the transmission control circuit 142 via a signal path 152, and the transmission control circuit 142 is operable to process the speed signal produced by the speed sensor 146 in a conventional manner to determine the rotational speed of the pump shaft 106/drive unit output shaft 104.

The transmission 118 illustratively includes another conventional speed sensor 148 that is positioned and configured to produce a speed signal corresponding to the rotational speed of the transmission input shaft 124, which is the same rotational speed as the turbine shaft 114. The input shaft 124 of the transmission 118 is directly coupled to, or integral with, the turbine shaft 114, and the speed sensor 148 may alternatively be positioned and configured to produce a speed signal corresponding to the rotational speed of the turbine shaft 114. In any case, the speed sensor 148 is electrically connected to a transmission input shaft speed input, TIS, of the transmission control circuit 142 via a signal path 154, and the transmission control circuit 142 is operable to process the speed signal produced by the speed sensor 148 in a conventional manner to determine the rotational speed of the turbine shaft 114/transmission input shaft 124.

The transmission 118 further includes yet another speed sensor 150 that is positioned and configured to produce a speed signal corresponding to the rotational speed of the output shaft 126 of the transmission 118. The speed sensor 150 may be conventional, and is electrically connected to a transmission output shaft speed input, TOS, of the transmission control circuit 142 via a signal path 156. The transmission control circuit 142 is configured to process the speed signal produced by the speed sensor 150 in a conventional manner to determine the rotational speed of the transmission output shaft 126.

In the illustrated embodiment, the transmission 118 further includes one or more actuators configured to control various operations within the transmission 118. For example, the electro-hydraulic system 138 described herein illustratively includes a number of actuators, e.g., conventional solenoids or other conventional actuators, that are electrically connected to a number, J, of control outputs, $CP_1$-$CP_J$, of the transmission control circuit 142 via a corresponding number of signal paths $72_1$-$72_J$, where J may be any positive integer as described above. The actuators within the electro-hydraulic system 138 are each responsive to a corresponding one of the control signals, $CP_1$-$CP_J$, produced by the transmission control circuit 142 on one of the corresponding signal paths $72_1$-$72_J$ to control the friction applied by each of the plurality of friction devices by controlling the pressure of fluid within one or more corresponding fluid passageway $140_1$-$140_J$, and thus control the operation, i.e., engaging and disengaging, of one or more corresponding friction devices, based on information provided by the various speed sensors 146, 148, and/or 150.

The friction devices of the planetary gear system 122 are illustratively controlled by hydraulic fluid which is distributed by the electro-hydraulic system in a conventional manner. For example, the electro-hydraulic system 138 illustratively includes a conventional hydraulic positive displacement pump (not shown) which distributes fluid to the one or more friction devices via control of the one or more actuators within the electro-hydraulic system 138. In this embodiment, the control signals, $CP_1$-$CP_J$, are illustratively analog friction device pressure commands to which the one or more actuators are responsive to control the hydraulic pressure to the one or more frictions devices. It will be understood, however, that the friction applied by each of the plurality of friction devices may alternatively be controlled in accordance with other conventional friction device control structures and techniques, and such other conventional friction device control structures and techniques are contemplated by this disclosure. In any case, however, the analog operation of each of the friction devices is controlled by the control circuit 142 in accordance with instructions stored in the memory unit 144.

In the illustrated embodiment, the system 100 further includes a drive unit control circuit 160 having an input/output port (I/O) that is electrically coupled to the drive unit 102 via a number, K, of signal paths 162, wherein K may be any positive integer. The drive unit control circuit 160 may be conventional, and is operable to control and manage the overall operation of the drive unit 102. The drive unit control circuit 160 further includes a communication port, COM, which is electrically connected to a similar communication port, COM, of the transmission control circuit 142 via a number, L, of signal paths 164, wherein L may be any positive integer. The one or more signal paths 164 are typically referred to collectively as a data link. Generally, the drive unit control circuit 160 and the transmission control circuit 142 are operable to share information via the one or more signal paths 164 in a conventional manner. In one embodiment, for example, the drive unit control circuit 160 and transmission control circuit 142 are operable to share information via the one or more signal paths 164 in the form of one or more messages in accordance with a society of automotive engineers (SAE) J-1939 communications protocol, although this disclosure contemplates other embodiments in which the drive unit control circuit 160 and the transmission control circuit 142 are operable to share information via the one or more signal paths 164 in accordance with one or more other conventional communication protocols (e.g., from a conventional databus such as J1587 data bus, J1939 data bus, IESCAN data bus, GMLAN, Mercedes PT-CAN).

Figure 2:
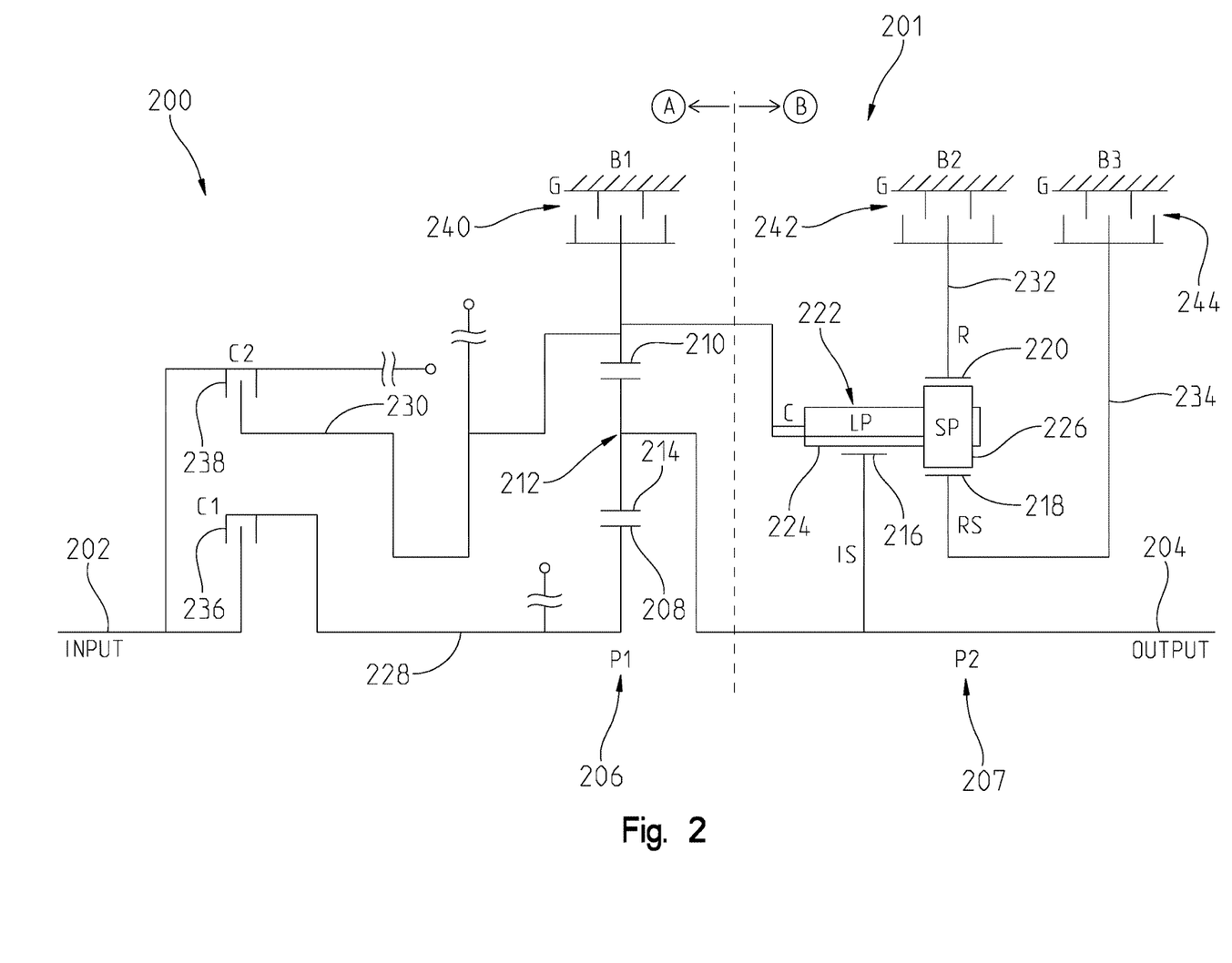
FIG. 2 is a diagrammatic view of a first embodiment of a transmission multiple-speed adder.

Referring to FIG. 2, a schematic representation or stick diagram illustrates one embodiment of a multi-speed transmission 200 according to the present disclosure. The transmission 200 includes an input shaft 202 and an output shaft 204. The input shaft 202 and output shaft 204 can be disposed along the same axis or centerline of the transmission 200. In another aspect, the different shafts can be disposed along different axes or centerlines. In a further aspect, the different shafts can be disposed parallel to one another, but along different axes or centerlines. Other aspect can be appreciated by one skilled in the art.

The transmission 200 can also include a plurality of planetary gearsets. In the illustrated embodiment of FIG. 2, the transmission 200 may include at least a first planetary gearset 206 and a second planetary gearset 207. Each planetary gearset can be referred to as a simple or compound planetary gearset. For example, in some aspects, one or more of the plurality of planetary gearsets can be formed as an idler planetary gearset or a Ravigneaux gearset. In FIG. 2, however, the first planetary gearset 206 is formed as a simple planetary gearset and the second planetary gearset 207 is formed as a Ravigneaux gearset.

One or more of the plurality of planetary gearsets can be arranged in different locations within the transmission 200, but for sake of simplicity and in this particular example only, the planetary gearsets are aligned in an axial direction consecutively in sequence (i.e., first, second, etc. between the input and output shafts).

The transmission 200 may also include a plurality of torque-transmitting or gearshifting mechanisms. For example, one or more of these mechanisms can include a clutch or brake. In one aspect, each of the plurality of mechanisms is disposed within an outer housing of the transmission 200. In another aspect, however, one or more of the mechanisms may be disposed outside of the housing. Each of the plurality of mechanisms can be coupled to one or more of the plurality of planetary gearsets, which will be described further below.

In the embodiment of FIG. 2, the transmission 200 can include a first torque-transmitting mechanism 236 and a second torque-transmitting mechanism 238 that are configured to function as clutches. These can be shiftable friction-locked multi-disk clutches, shiftable form-locking claw or conical clutches, wet clutches, or any other known form of a clutch. The transmission 200 can also include a third torque-transmitting mechanism 240, a fourth torque-transmitting mechanism 242, and a fifth torque-transmitting mechanism 244 that are configured to function as brakes (e.g., the torque-transmitting mechanism is fixedly coupled to the outer housing of the transmission 200). Each brake can be configured as a shiftable-friction-locked disk brake, shiftable friction-locked band brake, shiftable form-locking claw or conical brake, or any other type of known brake. With these five torque-transmitting mechanisms, selective shifting of at least four forward gears and at least one reverse gear is possible.

The transmission 200 of FIG. 2 may also include five or more different shafts, which is inclusive of the input shaft 202 and output shaft 204. Each of these shafts, designated as a first shaft 228, a second shaft 230, a third shaft 232, and a fourth shaft 234 are configured to be connected to one or more of the plurality of planetary gearsets or plurality of torque-transmitting mechanism between the input shaft 202 and output shaft 204. Further, in FIG. 2 (and also in FIGS. 3 and 4), the symbol "≈" refers to the corresponding shaft not ending but rather possibly connecting to another component such as an additional torque-transmitting mechanism, planetary gearset, or the like.

In FIG. 2, the first planetary gearset 206 can include a first sun gear 208, a first ring gear 210, and a first carrier member 212 that rotatably supports a set of pinion gears 214. The second planetary gearset 207, which is a compound planetary or Ravigneaux-type gearset, can include an input sun gear (IS) 216, a reaction sun gear (RS) 218, a second ring gear (R) 220, and a second carrier member 222 that rotatably supports a first set of pinion gears 224 and a second set of pinion gears 226. In one example, the first set of pinion gears 224 may be referred to as long pinion gears and the second set of pinion gears 226 may be referred to as short pinion gears. In at least one example, the long pinion gears have a greater dimension defined as a length than the short pinion gears. The first and second sets of pinion gears may mesh with one another. Moreover, the input sun gear 216 meshes with the first set of pinion gears 224, whereas the reaction sun gear 218 and second ring gear 220 mesh with the second set of pinion gears 226.

In the second planetary gearset, the second ring gear 220 is selectively coupled to the transmission housing via the second torque-transmitting mechanism 242, and the reaction sun gear 218 is selectively coupled to the transmission housing via the third torque-transmitting mechanism 244.

The transmission 200 of FIG. 2 is capable of transferring torque from the input shaft 202 to the output shaft 204 in a plurality of forward gears or ratios and at least one reverse gear or ratio. Each of the forward torque ratios and the reverse torque ratios can be attained by the selective engagement of one or more of the torque-transmitting mechanisms (i.e., torque-transmitting mechanisms 236, 238, 240, 242, 244). Those skilled in the art will readily understand that a different speed ratio is associated with each torque ratio.

As for the transmission 200, kinematic coupling of the first planetary gearset 206 is shown in FIG. 2. The first sun gear 208 is coupled to the first shaft 228 for common rotation therewith. The first carrier member 212 is coupled to the output shaft 204 and the input sun gear 216 for common rotation therewith. First ring gear 210 is coupled for common rotation with the second shaft 230 and the second carrier member 222.

With respect to the second planetary gearset 207, the input sun gear 216 is coupled to the output shaft 204 and the first carrier member 212 for common rotation therewith. The second ring gear 220 is coupled to the third shaft 232 for common rotation therewith. The reaction sun gear 218 is coupled to the fourth shaft 234 for common rotation therewith. The first set of pinion gears 224 are configured to intermesh with the input sun gear 216 and the second set of pinion gears 226 are configured to intermesh with the reaction sun gear 218 and the second ring gear 220

With regards to the kinematic coupling of the five torque-transmitting mechanisms to the previously described shafts, the multiple speed transmission 200 of FIG. 2 provides that the first torque-transmitting mechanism 236 is arranged within the power flow between at least the input shaft 202 and the first shaft 228 and the first sun gear 208. In this manner, the first torque-transmitting mechanism 236 is configured to act as a clutch. The second torque-transmitting mechanism 238 is arranged within the power flow between at least the input shaft 202 and the second shaft 230, the first ring gear 210, and the second carrier member 222. In this manner, the second torque-transmitting mechanism 238 is configured to act as a clutch. In this embodiment of the transmission 200 therefore two of the five torque-transmitting mechanisms are configured to act as a clutch and the other three torque-transmitting mechanisms are configured to act as brakes.

The third torque-transmitting mechanism 240, for example, is arranged within the power flow between the second shaft 230, the first ring gear 210, and the second carrier member 222 and the stationary transmission housing, G. The fourth torque-transmitting mechanism 242 is arranged within the power flow between the third shaft 232 and the second ring gear 220 and the stationary transmission housing, G. Moreover, the fifth torque-transmitting mechanism 244 is arranged within the power flow between the fourth shaft 234 and the reaction sun gear 218 and the stationary transmission housing, G.

The kinematic couplings of the embodiment in FIG. 2 can further be described with respect to the selective engagement of the torque-transmitting mechanisms with respect to one or more components of the plurality of planetary gearsets. For example, in the transmission 200, the first torque-transmitting mechanism 236 is selectively engageable to couple the input shaft 202 to the first shaft 228 and the first sun gear 208. The second torque-transmitting mechanism 238 is selectively engageable to couple the input shaft 202 to the second shaft 230, the first ring gear 210, and the second carrier member 222.

Moreover, the third torque-transmitting mechanism 240 is selectively engageable to couple second shaft 230, the first ring gear 210, and the second carrier member 222 to the housing G of the transmission 200. The fourth torque-transmitting mechanism 242 is selectively engageable to couple third shaft 232 and the second ring gear 220 to the housing G of the transmission 200. Lastly, the fifth torque-transmitting mechanism 244 is selectively engageable to couple the fourth shaft 234 and the reaction sun gear 218 to the housing G of the transmission 200.

In the present disclosure, the transmission incorporates compounding to achieve additional ranges or ratios. Compounding in this context involves connecting two or more members of one planetary gearset to two or more members of another planetary gearset with yet another member serving as a reaction member for the geartrain. Compounding provides gear ratios that are otherwise unattainable in a simple planetary gearset (i.e., one sun gear, one ring gear, and one carrier member). This compounding, however, is not simply connecting different gearsets in series. The output of the first gearset is generally the input to the second gearset. The output of the second gearset may then be fed back to what normally may have been the reaction member of the first gearset. The new reaction member for the geartrain is in the second gearset. The resulting gear ratio may differ from the result of the reaction member being in the first gearset.

In one example, it is possible to compound a planetary gearset such that its normal braked reaction member is made to rotate in one direction only relative to the input direction of the gearset. The second gearset is generally a simple gearset with one brake. In this disclosure, however, the embodiments described herein may compound a planetary gearset such that its normal braked reaction member is made to rotate in both directions relative to the input direction of the gearset. This would otherwise require a simple second gearset to employ an additional number of clutches and brakes or even a third gearset with its clutches or brakes.

It has been found that the benefit of rotating the gearset's normally braked member in both the same and opposite directions as the gearset input is the ability to add both deeper and shallower gear ratios or speeds to the transmission as opposed to just adding one or the other. This ability can be applied with the transmission is in reverse as well. In order to achieve this, the transmission 200 of FIG. 2 is designed such that the carrier output is located in the front of the carrier. By doing so, this facilitates feeding the output of the second planetary gearset 207 back to the first ring gear 210 in order to accomplish the compounding of the first planetary gearset 206. The short pinion gears, i.e., the second set of pinion gears 226, and the second ring gear 220 are positioned to the rear end of the long pinion gears, the first set of pinion gears 224.

In addition, the reaction sun gear 218 is positioned to the rear of the long pinion gears 224. As such, the reaction sun gear 218 is able to mesh with the short pinion gears 226. The reaction sun gear 218 therefore is connected to the third brake 244.

In the aforementioned embodiment of the transmission 200, the input sun gear 216 is connected to the first carrier member 212, which is the output of the first planetary gearset 206. The first sun gear 208 functions as the input of the first planetary gearset 206. Thus, the output of the first planetary gearset 206 becomes the input to the second planetary gearset 207. Moreover, the output of the second planetary gearset 207 is configured as the second carrier member 222, which feeds torque to the first ring gear 210 to complete the compounding action.

An advantage of the embodiment of FIG. 2 is the ability to incorporate the second planetary gearset 207 in an add-on housing 201 to the rear of the transmission 200. In other words, the dashed line that separates a first portion A may be from an existing transmission 200 from a second portion B which includes the add-on housing 201 and the compound planetary or Ravigneaux-type gearset 207. By doing this, the existing arrangement of components including the first planetary gearset 206 of the transmission 200 may be uninterrupted and connected to the components of the add-on housing 201.

During forward operation, with the first torque-transmitting mechanism 236 and the fourth torque-transmitting mechanism 242 engaged or applied, the second carrier member 222 and the first ring gear 210 may rotate in reverse thereby allowing for an added forward speed or gear ratio that is generally deeper (i.e., higher gear ratio) than the existing forward speed or gear ratio resulting from applying the first torque-transmitting mechanism 236 and the third torque-transmitting mechanism 240.

With the first torque-transmitting mechanism 236 and the fifth torque-transmitting mechanism 244 engaged or applied, the second carrier member 222 and the first ring gear 210 may rotate in a forward direction thereby providing another added forward transmission speed or gear ratio that is shallower (i.e., smaller gear ratio) than the existing forward speed or gear ratio resulting from applying the first and third torque-transmitting mechanisms.

When the first carrier member 212 rotates in reverse, applying or engaging the fourth torque-transmitting mechanism 242 causes the second carrier member 222 and the first ring gear 210 to rotate in a forward direction thereby providing an additional reverse transmission speed or gear ratio that is deeper than the existing reverse speed or gear ratio resulting from applying the third torque-transmitting mechanism 240. Further, with the first carrier member 212 rotating in reverse, applying or engaging the fifth torque-transmitting mechanism 244 instead of the fourth torque-transmitting mechanism 242 causes the second carrier member 222 and the first ring gear 210 to rotate in a reverse direction thereby adding another reverse transmission speed or gear ratio that is shallower than the existing reverse speed or gear ratio resulting from applying the third torque-transmitting mechanism 240.

Moreover, forward and reverse speed or gear ratios involving the fourth torque-transmitting mechanism 242 can be adjusted without affecting the gear ratios involving the fifth torque-transmitting mechanism 244 and vice versa.

In another embodiment of the present disclosure, the second torque-transmitting mechanism 238 may be engaged or applied rather than the first torque-transmitting mechanism 236. Here, the second carrier member 222 is an input, and applying the second torque-transmitting mechanism 238 and the fourth torque-transmitting mechanism 242 may provide a third added reverse transmission speed or gear ratio that is considered an overdrive. Moreover, if the second torque-transmitting mechanism 238 and the fifth torque-transmitting mechanism 244 (instead of the fourth torque-transmitting mechanism 242) provides a third added forward transmission speed or gear ratio that is an overdrive. In this embodiment, the gear ratio involving the fourth torque-transmitting mechanism 242 can be adjusted without affecting the gear ratio involving the fifth torque-transmitting mechanism 244 and vice versa.

In this embodiment, a non-limiting example of a six-speed transmission may be mounted to the add-on housing 201 of FIG. 2 in which the input sun gear 216 has 34 gear teeth, the reaction sun gear 218 has 32 gear teeth, and the second ring gear 220 includes 86 gear teeth. Due to the compounding by the second planetary gearset 207, the six speed transmission may be converted to a transmission capable of achieving up to nine forward transmission speeds and four reverse transmission speeds with the following gear ratios set forth in Table 1 below:

TABLE 1

| Applied Clutch or Brake | Type of Range | Gear Ratio |
| --- | --- | --- |
| C1, B2 | Added due to Compounding | 5.02 |
| C1, B1 | Previously Existing | 3.43 |
| C1, B3 | Added due to Compounding | 2.18 |
|  | Previously Existing | 2.01 |
|  | Previously Existing | 1.42 |
|  | Previously Existing | 1.00 |
|  | Previously Existing | 0.83 |
|  | Previously Existing | 0.59 |
| C2, B3 | Added due to Compounding | 0.52 |
| Existing Clutch X, B2 | Added due to Compounding | −8.66 |
| Existing Clutch X, B1 | Previously Existing | −4.84 |
| Existing Clutch X, B3 | Added due to Compounding | −1.83 |
| C2, B2 | Added due to Compounding | −0.65 |

Figure 3:
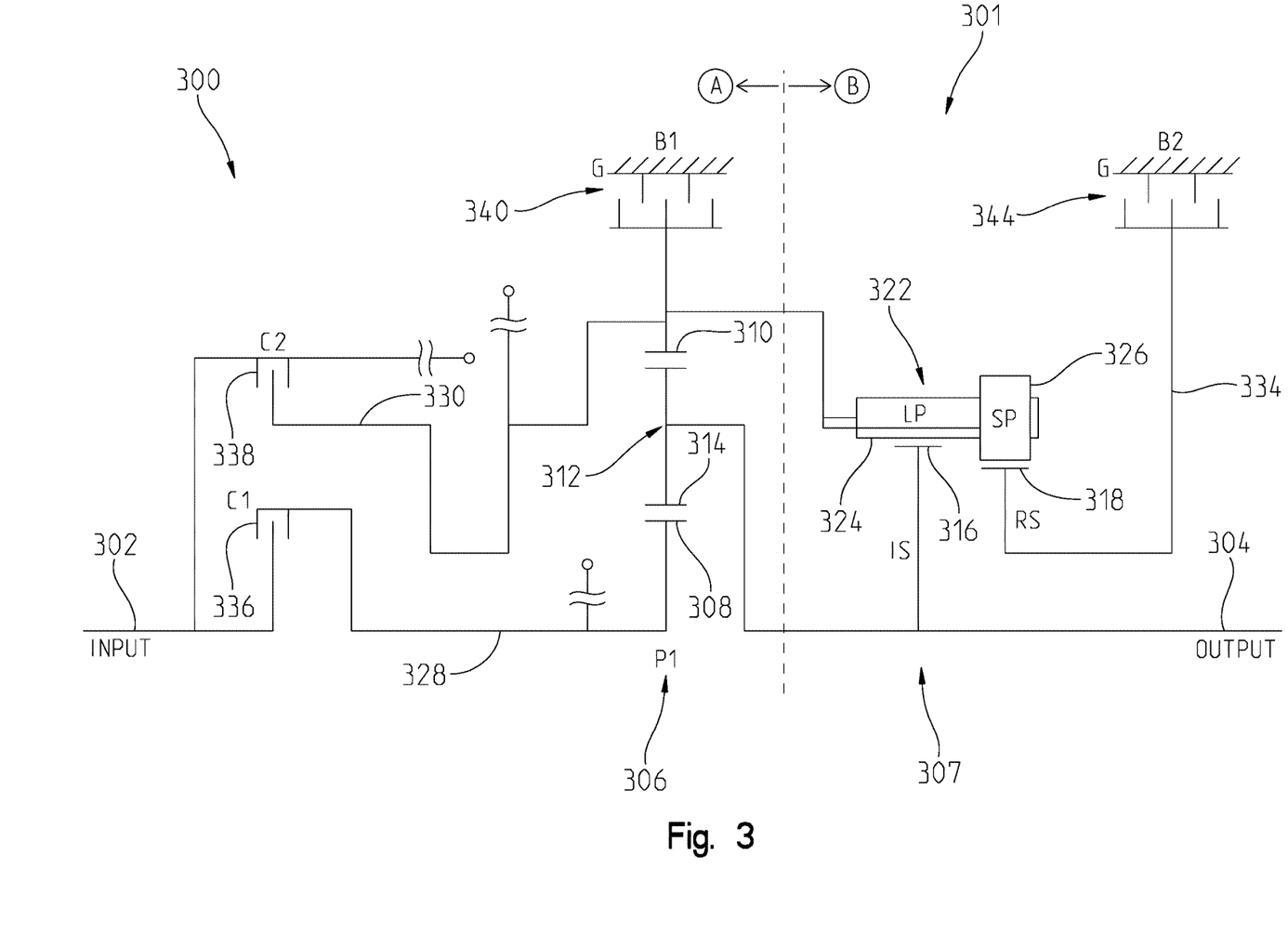
FIG. 3 is a diagrammatic view of a second embodiment of a transmission multiple-speed adder.

Referring to FIG. 3, a further embodiment of the present disclosure is illustrated. Here, a schematic representation or stick diagram illustrates an embodiment of a multi-speed transmission 300 which is similar to the embodiment of FIG. 2. In this embodiment, however, the transmission 300 is configured without the second ring gear 220 and brake 242. Instead, the transmission 300 includes an input shaft 302 and an output shaft 304. The input shaft 302 and output shaft 304 can be disposed along the same axis or centerline of the transmission 300. In another aspect, the different shafts can be disposed along different axes or centerlines. In a further aspect, the different shafts can be disposed parallel to one another, but along different axes or centerlines. Other aspect can be appreciated by one skilled in the art.

The transmission 300 can also include a plurality of planetary gearsets. In the illustrated embodiment of FIG. 3, the transmission 300 may include at least a first planetary gearset 306 and a second planetary gearset 307. Each planetary gearset can be referred to as a simple or compound planetary gearset. For example, in some aspects, one or more of the plurality of planetary gearsets can be formed as an idler planetary gearset or a Ravigneaux gearset. In FIG. 3, however, the first planetary gearset 306 is formed as a simple planetary gearset and the second planetary gearset 307 is formed as a Ravigneaux gearset.

One or more of the plurality of planetary gearsets can be arranged in different locations within the transmission 300, but for sake of simplicity and in this particular example only, the planetary gearsets are aligned in an axial direction consecutively in sequence (i.e., first, second, etc. between the input and output shafts).

The transmission 300 may also include a plurality of torque-transmitting or gearshifting mechanisms. For example, one or more of these mechanisms can include a clutch or brake. In one aspect, each of the plurality of mechanisms is disposed within an outer housing of the transmission 300. In another aspect, however, one or more of the mechanisms may be disposed outside of the housing. Each of the plurality of mechanisms can be coupled to one or more of the plurality of planetary gearsets, which will be described further below.

In the embodiment of FIG. 3, the transmission 300 can include a first torque-transmitting mechanism 336 and a second torque-transmitting mechanism 338 that are configured to function as clutches. These can be shiftable friction-locked multi-disk clutches, shiftable form-locking claw or conical clutches, wet clutches, or any other known form of a clutch. The transmission 300 can also include a third torque-transmitting mechanism 340 and a fourth torque-transmitting mechanism 344 that are configured to function as brakes (e.g., the torque-transmitting mechanism is fixedly coupled to the outer housing G of the transmission 300). Each brake can be configured as a shiftable-friction-locked disk brake, shiftable friction-locked band brake, shiftable form-locking claw or conical brake, or any other type of known brake. With these four torque-transmitting mechanisms, selective shifting of at least three forward gears is possible.

The transmission 300 of FIG. 3 may also include four or more different shafts, which is inclusive of the input shaft 302 and output shaft 304. Each of these shafts, designated as a first shaft 328, a second shaft 330, and a third shaft 334 are configured to be connected to one or more of the plurality of planetary gearsets or plurality of torque-transmitting mechanism between the input shaft 302 and output shaft 304.

In FIG. 3, the first planetary gearset 306 can include a first sun gear 308, a first ring gear 310, and a first carrier member 312 that rotatably supports a set of pinion gears 314. The second planetary gearset 307, which is a compound planetary or Ravigneaux-type gearset, can include an input sun gear (IS) 316, a reaction sun gear (RS) 318, and a second carrier member 322 that rotatably supports a first set of pinion gears 324 and a second set of pinion gears 326. In one example, the first set of pinion gears 324 may be referred to as long pinion gears and the second set of pinion gears 326 may be referred to as short pinion gears. The first and second sets of pinion gears may mesh with one another. Moreover, the input sun gear 316 meshes with the first set of pinion gears 324, whereas the reaction sun gear 318 meshes with the second set of pinion gears 326.

In the second planetary gearset, the reaction sun gear 318 is selectively coupled to the transmission housing G via the fourth torque-transmitting mechanism 344.

The transmission 300 of FIG. 3 is capable of transferring torque from the input shaft 302 to the output shaft 304 in a plurality of forward gears or ratios. Each of the forward torque ratios can be attained by the selective engagement of one or more of the torque-transmitting mechanisms (i.e., torque-transmitting mechanisms 336, 338, 340, and 344). Those skilled in the art will readily understand that a different speed ratio is associated with each torque ratio.

As for the transmission 300, kinematic coupling of the first planetary gearset 306 is shown in FIG. 3. The first sun gear 308 is coupled to the first shaft 328 for common rotation therewith. The first carrier member 312 is coupled to the output shaft 304 and the input sun gear 316 for common rotation therewith. First ring gear 310 is coupled for common rotation with the second shaft 330 and the second carrier member 322.

With respect to the second planetary gearset 307, the input sun gear 316 is coupled to the output shaft 304 and the first carrier member 312 for common rotation therewith. The reaction sun gear 318 is coupled to the third shaft 334 for common rotation therewith. The first set of pinion gears 324 are configured to intermesh with the input sun gear 316 and the second set of pinion gears 326 are configured to intermesh with the reaction sun gear 318.

With regards to the kinematic coupling of the four torque-transmitting mechanisms to the previously described shafts, the multiple speed transmission 300 of FIG. 3 provides that the first torque-transmitting mechanism 336 is arranged within the power flow between at least the input shaft 302 and the first shaft 328 and the first sun gear 308. In this manner, the first torque-transmitting mechanism 336 is configured to act as a clutch. The second torque-transmitting mechanism 338 is arranged within the power flow between at least the input shaft 302 and the second shaft 330, the first ring gear 310, and the second carrier member 322. In this manner, the second torque-transmitting mechanism 338 is configured to act as a clutch. In this embodiment of the transmission 300 therefore two of the four torque-transmitting mechanisms are configured to act as a clutch and the other two torque-transmitting mechanisms are configured to act as brakes.

The third torque-transmitting mechanism 340, for example, is arranged within the power flow between the second shaft 330, the first ring gear 310, and the second carrier member 322 and the stationary transmission housing, G. The fourth torque-transmitting mechanism 344 is arranged within the power flow between the third shaft 334 and the reaction sun gear 318 and the stationary transmission housing, G.

The kinematic couplings of the embodiment in FIG. 3 can further be described with respect to the selective engagement of the torque-transmitting mechanisms with respect to one or more components of the plurality of planetary gearsets. For example, in the transmission 300, the first torque-transmitting mechanism 336 is selectively engageable to couple the input shaft 302 to the first shaft 328 and the first sun gear 308. The second torque-transmitting mechanism 338 is selectively engageable to couple the input shaft 302 to the second shaft 330, the first ring gear 310, and the second carrier member 322.

Moreover, the third torque-transmitting mechanism 340 is selectively engageable to couple second shaft 330, the first ring gear 310, and the second carrier member 322 to the housing G of the transmission 300. The fourth torque-transmitting mechanism 344 is selectively engageable to couple third shaft 334 and the reaction sun gear 318 to the housing G of the transmission 300.

Similar to the embodiment of FIG. 2, the transmission 300 of FIG. 3 is designed such that the carrier output is located in the front of the carrier. By doing so, this facilitates feeding the output of the second planetary gearset 307 back to the first ring gear 310 in order to accomplish the compounding of the first planetary gearset 306. The short pinion gears, i.e., the second set of pinion gears 326, are similarly positioned to the rear end of the long pinion gears, i.e., the first set of pinion gears 324.

In the aforementioned embodiment of the transmission 300, the input sun gear 316 is connected to the first carrier member 312, which is the output of the first planetary gearset 306. The first sun gear 308 functions as the input of the first planetary gearset 306. Thus, the output of the first planetary gearset 306 becomes the input to the second planetary gearset 307. Moreover, the output of the second planetary gearset 307 is configured as the second carrier member 322, which feeds torque to the first ring gear 310 to complete the compounding action.

Also similar to the transmission 200 of FIG. 2, the second planetary gearset 307 may be configured in an add-on housing 301 to the rear of the transmission 300. In other words, the dashed line that separates a first portion A may be from an existing transmission 300 from a second portion B which includes the add-on housing 301 and the compound planetary or Ravigneaux-type gearset 307. By doing this, the existing arrangement of components including the first planetary gearset 306 of the transmission 300 may be uninterrupted and connected to the components of the add-on housing 301.

With the first torque-transmitting mechanism 336 and the fourth torque-transmitting mechanism 344 engaged or applied, the second carrier member 322 and the first ring gear 310 may rotate in a forward direction thereby providing an added forward transmission speed or gear ratio that is shallower (i.e., smaller numerical gear ratio) than the existing forward speed or gear ratio resulting from applying the first and third torque-transmitting mechanisms.

When the first carrier member 312 rotating in reverse, applying or engaging the fourth torque-transmitting mechanism 344 causes the second carrier member 322 and the first ring gear 310 to rotate in a reverse direction thereby adding a reverse transmission speed or gear ratio that is shallower than the existing reverse speed or gear ratio resulting from applying the third torque-transmitting mechanism 340.

In another embodiment of the present disclosure, the second torque-transmitting mechanism 338 may be engaged or applied rather than the first torque-transmitting mechanism 336. Here, the second carrier member 322 is an input, and applying the second torque-transmitting mechanism 238 and the fourth torque-transmitting mechanism 344 provides a second added forward transmission speed or gear ratio that is an overdrive. Thus, in the embodiment of FIG. 3, the additional add-on housing 301 or, more specifically the additional compounding planetary gearset 307, allows for an existing six-speed transmission to be converted to a transmission capable of achieving eight forward speeds and two reverse speeds. An example of this in which the input sun gear 316 has 34 gear teeth and the reaction sun gear 318 has 32 gear teeth is shown in Table 2 below.

TABLE 2

| Applied Clutch or Brake | Type of Range | Gear Ratio |
|---|---|---|
| C1, B1 | Previously Existing | 3.43 |
| C1, B2 | Added due to Compounding | 2.18 |
|  | Previously Existing | 2.01 |
|  | Previously Existing | 1.42 |
|  | Previously Existing | 1.00 |
|  | Previously Existing | 0.83 |
|  | Previously Existing | 0.59 |
| C2, B2 | Added due to Compounding | 0.52 |
| Existing Clutch X, B1 | Previously Existing | −4.84 |
| Existing Clutch X, B2 | Added due to Compounding | −1.83 |

Figure 4:
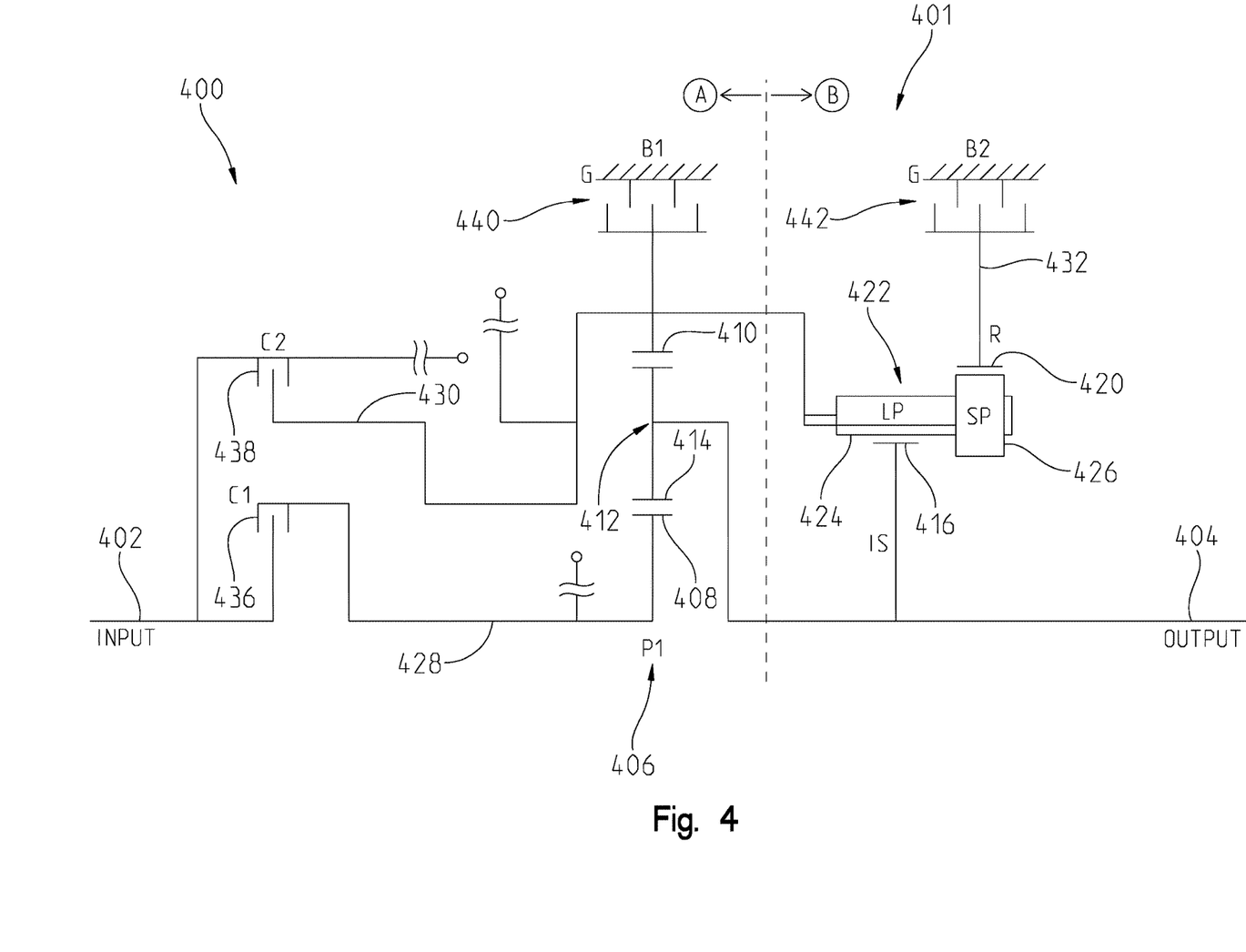
FIG. 4 is a diagrammatic view of a third embodiment of a transmission multiple-speed adder.

Referring to FIG. 4, another embodiment of the present disclosure is illustrated. Here, a schematic representation or stick diagram illustrates an embodiment of a multi-speed transmission 400 which is similar to the embodiment of FIG. 2. In this embodiment, however, the transmission 400 is configured without the reaction sun gear 218 and brake 244. Instead, the transmission 400 includes an input shaft 402 and an output shaft 404. The input shaft 402 and output shaft 404 can be disposed along the same axis or centerline of the transmission 400. In another aspect, the different shafts can be disposed along different axes or centerlines. In a further aspect, the different shafts can be disposed parallel to one another, but along different axes or centerlines. Other aspect can be appreciated by one skilled in the art.

The transmission 400 can also include a plurality of planetary gearsets. In the illustrated embodiment of FIG. 4, the transmission 400 may include at least a first planetary gearset 406 and a second planetary gearset 407. Each planetary gearset can be referred to as a simple or compound planetary gearset. For example, in some aspects, one or more of the plurality of planetary gearsets can be formed as an idler planetary gearset or a Ravigneaux gearset. In FIG. 4, however, the first planetary gearset 406 is formed as a simple planetary gearset and the second planetary gearset 407 is formed as an idler planetary gearset.

One or more of the plurality of planetary gearsets can be arranged indifferent locations within the transmission 400, but for sake of simplicity and in this particular example only, the planetary gearsets are aligned in an axial direction consecutively in sequence (i.e., first, second, etc. between the input and output shafts).

The transmission 400 may also include a plurality of torque-transmitting or gearshifting mechanisms. For example, one or more of these mechanisms can include a clutch or brake. In one aspect, each of the plurality of mechanisms is disposed within an outer housing of the transmission 400. In another aspect, however, one or more of the mechanisms may be disposed outside of the housing. Each of the plurality of mechanisms can be coupled to one or more of the plurality of planetary gearsets, which will be described further below.

In the embodiment of FIG. 4, the transmission 400 can include a first torque-transmitting mechanism 436 and a second torque-transmitting mechanism 438 that are configured to function as clutches. These can be shiftable friction-locked multi-disk clutches, shiftable form-locking claw or conical clutches, wet clutches, or any other known form of a clutch. The transmission 400 can also include a third torque-transmitting mechanism 440 and a fourth torque-transmitting mechanism 442 that are configured to function as brakes (e.g., the torque-transmitting mechanism is fixedly coupled to the outer housing G of the transmission 400). Each brake can be configured as a shiftable-friction-locked disk brake, shiftable friction-locked band brake, shiftable form-locking claw or conical brake, or any other type of known brake. With these four torque-transmitting mechanisms, selective shifting of at least two forward gears and at least one reverse gear is possible.

The transmission 400 of FIG. 4 may also include four or more different shafts, which is inclusive of the input shaft 402 and output shaft 404. Each of these shafts, designated as a first shaft 428, a second shaft 430, and a third shaft 432 are configured to be connected to one or more of the plurality of planetary gearsets or plurality of torque-transmitting mechanism between the input shaft 402 and output shaft 404.

In FIG. 4, the first planetary gearset 406 can include a first sun gear 408, a first ring gear 410, and a first carrier member 412 that rotatably supports a set of pinion gears 414. The second planetary gearset 407, which is an idler planetary gearset, can include an input sun gear (IS) 416, a second ring gear 420, and a second carrier member 422 that rotatably supports a first set of pinion gears 424 and a second set of pinion gears 426. In one example, the first set of pinion gears 424 may be referred to as long pinion gears and the second set of pinion gears 426 may be referred to as short pinion gears. The first and second sets of pinion gears may mesh with one another. Moreover, the input sun gear 416 meshes with the first set of pinion gears 424, whereas the second ring gear 420 meshes with the second set of pinion gears 426.

In the second planetary gearset, the second ring gear 420 is selectively coupled to the transmission housing G via the fourth torque-transmitting mechanism 442.

The transmission 400 of FIG. 4 is capable of transferring torque from the input shaft 402 to the output shaft 404 in a plurality of forward gears or ratios and at least one reverse gear or ratio. Each of the forward torque ratios and the reverse torque ratios can be attained by the selective engagement of one or more of the torque-transmitting mechanisms (i.e., torque-transmitting mechanisms 436, 438, 440, and 442). Those skilled in the art will readily understand that a different speed ratio is associated with each torque ratio.

As for the transmission 400, kinematic coupling of the first planetary gearset 406 is shown in FIG. 4. The first sun gear 408 is coupled to the first shaft 428 for common rotation therewith. The first carrier member 412 is coupled to the output shaft 404 and the input sun gear 416 for common rotation therewith. First ring gear 410 is coupled for common rotation with the second shaft 430 and the second carrier member 422

With respect to the second planetary gearset 407, the input sun gear 416 is coupled to the output shaft 404 and the first carrier member 412 for common rotation therewith. The second ring gear 420 is coupled to the third shaft 432 for common rotation therewith. The first set of pinion gears 424 are configured to intermesh with the input sun gear 416 and the second set of pinion gears 426 are configured to intermesh with the second ring gear 420.

With regards to the kinematic coupling of the four torque-transmitting mechanisms to the previously described shafts, the multiple speed transmission 400 of FIG. 4 provides that the first torque-transmitting mechanism 436 is arranged within the power flow between at least the input shaft 402 and the first shaft 428 and the first sun gear 408. In this manner, the first torque-transmitting mechanism 436 is configured to act as a clutch. The second torque-transmitting mechanism 438 is arranged within the power flow between at least the input shaft 402 and the second shaft 430, the first ring gear 410, and the second carrier member 422. In this manner, the second torque-transmitting mechanism 438 is configured to act as a clutch. In this embodiment of the transmission 400 therefore two of the four torque-transmitting mechanisms are configured to act as a clutch and the other two torque-transmitting mechanisms are configured to act as brakes.

The third torque-transmitting mechanism 440, for example, is arranged within the power flow between the second shaft 430, the first ring gear 410, and the second carrier member 422 and the stationary transmission housing, G. The fourth torque-transmitting mechanism 442 is arranged within the power flow between the third shaft 432 and the second ring gear 420 and the stationary transmission housing, G.

The kinematic couplings of the embodiment in FIG. 4 can further be described with respect to the selective engagement of the torque-transmitting mechanisms with respect to one or more components of the plurality of planetary gearsets. For example, in the transmission 400, the first torque-transmitting mechanism 436 is selectively engageable to couple the input shaft 402 to the first shaft 428 and the first sun gear 408. The second torque-transmitting mechanism 438 is selectively engageable to couple the input shaft 402 to the second shaft 430, the first ring gear 410, and the second carrier member 422.

Moreover, the third torque-transmitting mechanism 440 is selectively engageable to couple second shaft 430, the first ring gear 410, and the second carrier member 422 to the housing G of the transmission 400. The fourth torque-transmitting mechanism 442 is selectively engageable to couple third shaft 432 and the second ring gear 420 to the housing G of the transmission 400.

Similar to the embodiment of FIG. 2, the transmission 400 of FIG. 4 is designed such that the carrier output is located in the front of the carrier. By doing so, this facilitates feeding the output of the second planetary gearset 407 back to the first ring gear 410 in order to accomplish the compounding of the first planetary gearset 406. The short pinion gears, i.e., the second set of pinion gears 426, are similarly positioned to the rear end of the long pinion gears, i.e., the first set of pinion gears 424.

In the aforementioned embodiment of the transmission 400, the input sun gear 416 is connected to the first carrier member 412, which is the output of the first planetary gearset 406. The first sun gear 408 functions as the input of the first planetary gearset 406. Thus, the output of the first planetary gearset 406 becomes the input to the second planetary gearset 407. Moreover, the output of the second planetary gearset 407 is configured as the second carrier member 422, which feeds torque to the first ring gear 410 to complete the compounding action.

Also similar to the transmission 200 of FIG. 2, the second planetary gearset 407 may be configured in an add-on housing 401 to the rear of the transmission 400. In other words, the dashed line that separates a first portion A may be from an existing transmission 400 from a second portion B which includes the add-on housing 401 and the idler planetary gearset 407. By doing this, the existing arrangement of components including the first planetary gearset 406 of the transmission 400 may be uninterrupted and connected to the components of the add-on housing 401.

During operation, with the first torque-transmitting mechanism 436 and the fourth torque-transmitting mechanism 442 engaged or applied, the second carrier member 422 and the first ring gear 410 may rotate in reverse thereby allowing for an added forward speed or gear ratio that is generally deeper (i.e., higher numerical gear ratio) than the existing forward speed or gear ratio resulting from applying the first torque-transmitting mechanism 436 and the third torque-transmitting mechanism 440.

When the first carrier member 412 rotates in reverse, applying or engaging the fourth torque-transmitting mechanism 442 causes the second carrier member 422 and the first ring gear 410 to rotate in a forward direction thereby providing an additional reverse transmission speed or gear ratio that is deeper than the existing reverse speed or gear ratio resulting from applying the third torque-transmitting mechanism 440.

In another embodiment of the present disclosure, the second torque-transmitting mechanism 438 may be engaged or applied rather than the first torque-transmitting mechanism 436. Here, the second carrier member 422 is an input, and applying the second torque-transmitting mechanism 438 and the fourth torque-transmitting mechanism 442 may provide a third added reverse transmission speed or gear ratio that is considered an overdrive.

In this embodiment, a non-limiting example of a six-speed transmission may be mounted to the add-on housing

401 of FIG. 4 in which the input sun gear 416 has 34 gear teeth and the second ring gear 420 includes 86 gear teeth. Thus, in the embodiment of FIG. 4, the additional add-on housing 401 or, more specifically the additional compounding planetary gearset 407, allows for an existing six-speed transmission to be converted to a transmission capable of achieving seven forward speeds and three reverse speeds. An example of this is shown in Table 3 below.

TABLE 3

| Applied Clutch or Brake | Type of Range | Gear Ratio |
| --- | --- | --- |
| C1, B2 | Added due to Compounding | 5.02 |
| C1, B1 | Previously Existing | 3.43 |
| | Previously Existing | 2.01 |
| | Previously Existing | 1.42 |
| | Previously Existing | 1.00 |
| | Previously Existing | 0.83 |
| | Previously Existing | 0.59 |
| Existing Clutch X, B2 | Added due to Compounding | −8.66 |
| Existing Clutch X, B1 | Previously Existing | −4.84 |
| C2, B2 | Added due to Compounding | −0.65 |

While exemplary embodiments incorporating the principles of the present disclosure have been disclosed hereinabove, the present disclosure is not limited to the disclosed embodiments. Instead, this application is intended to cover any variations, uses, or adaptations of the disclosure using its general principles. Further, this application is intended to cover such departures from the present disclosure as come within known or customary practice in the art to which this disclosure pertains and which fall within the limits of the appended claims.

The invention claimed is:

1. A multiple speed transmission, comprising:
an input shaft;
an output shaft;
a first planetary gearset having a first member, a second member, and a third member;
a second planetary gearset having a first member, a reaction member, a second member, and a third member;
a plurality of interconnecting members each connected to at least one of the first and second planetary gearsets;
a first torque-transmitting mechanism selectively engageable to interconnect the input shaft with the first member of the first planetary gearset;
a second torque-transmitting mechanism selectively engageable to interconnect the input shaft with the third member of the first planetary gearset and the second member of the second planetary gearset;
a third torque-transmitting mechanism selectively engageable to interconnect the third member of the first planetary gearset and the second member of the second planetary gearset with a stationary member;
a fourth torque-transmitting mechanism selectively engageable to interconnect the third member of the second planetary gearset with the stationary member; and
a fifth torque-transmitting mechanism selectively engageable to interconnect the reaction member of the second planetary gearset with the stationary member;
wherein the output shaft is continuously interconnected with the second member of the first planetary gearset and the first member of the second planetary gearset;
wherein the torque transmitting mechanisms are selectively engageable in combinations of at least two to establish at least nine forward speed ratios and at least four reverse speed ratios between the input shaft and the output shaft.

2. The multiple speed transmission of claim 1, wherein the plurality of interconnecting members includes a first interconnecting member directly connected to the first member of the first planetary gearset.

3. The multiple speed transmission of claim 1, wherein the plurality of interconnecting members includes a second interconnecting member continuously interconnecting the third member of the first planetary gearset with the second member of the second planetary gearset.

4. The multiple speed transmission of claim 1, wherein the plurality of interconnecting members includes a third interconnecting member directly connected to the third member of the second planetary gearset.

5. The multiple speed transmission of claim 1, wherein the plurality of interconnecting members includes a fourth interconnecting member directly connected to the reaction member of the second planetary gearset.

6. The multiple speed transmission of claim 1, wherein the second member of the second planetary gearset comprises a first set of pinion gears and a second set of pinion gears, the first set of pinion gears meshing with the first member of the second planetary gearset and the second set of pinion gears meshing with the third member of the second planetary gearset and the reaction member of the second planetary gearset.

7. The multiple speed transmission of claim 6, wherein the first set of pinion gears comprises long pinion gears and the second set of pinion gears comprises short pinion gears.

8. The multiple speed transmission of claim 1, wherein the first planetary gearset is disposed within a transmission housing and the second planetary gearset is disposed within an add-on housing, the add-on housing being mounted to the transmission housing.

9. The multiple speed transmission of claim 1, wherein:
the first member of the first planetary gearset comprises an input to the first planetary gearset and the second member of the first planetary gearset comprises an output of the first planetary gearset;
the first member of the second planetary gearset comprises an input to the second planetary gearset and the second member of the second planetary gearset comprises an output of the second planetary gearset;
the output of the second planetary gearset is connected to the third member of the first planetary gearset to form a second input to the first planetary gearset.

10. The multiple speed transmission of claim 1, wherein:
the first members of the first and second planetary gearsets and the reaction member of the second planetary gearset comprise sun gears;
the second member of the first and second planetary gearsets comprise carrier members; and
the third members of the first and second planetary gearsets comprise ring gears.

11. A multiple speed transmission, comprising:
an input shaft;
an output shaft;
a first planetary gearset having a first member, a second member, and a third member;
a second planetary gearset having a first member, a reaction member, and a second member;
a plurality of interconnecting members each connected to at least one of the first and second planetary gearsets;

a first torque-transmitting mechanism selectively engageable to interconnect the input shaft with the first member of the first planetary gearset;

a second torque-transmitting mechanism selectively engageable to interconnect the input shaft with the third member of the first planetary gearset and the second member of the second planetary gearset;

a third torque-transmitting mechanism selectively engageable to interconnect the third member of the first planetary gearset and the second member of the second planetary gearset with a stationary member; and a fourth torque-transmitting mechanism selectively engageable to interconnect the reaction member of the second planetary gearset with the stationary member;

wherein, the output shaft is continuously interconnected with the second member of the first planetary gearset and the first member of the second planetary gearset;

wherein the torque transmitting mechanisms are selectively engageable in combinations of at least two to establish at least eight forward speed ratios and at least two reverse speed ratios between the input shaft and the output shaft.

12. The multiple speed transmission of claim 11, wherein:
the first members of the first and second planetary gearsets and the reaction member of the second planetary gearset comprise sun gears;
the second member of the first and second planetary gearsets comprise carrier members; and
the third member of the first planetary gearset comprises a ring gear.

13. The multiple speed transmission of claim 11, wherein:
the plurality of interconnecting members includes a first interconnecting member directly connected to the first member of the first planetary gearset;
the plurality of interconnecting members includes a second interconnecting member continuously interconnecting the third member of the first planetary gearset with the second member of the second planetary gearset; and
the plurality of interconnecting members includes a third interconnecting member directly connected to the reaction member of the second planetary gearset.

14. The multiple speed transmission of claim 11, wherein the second member of the second planetary gearset comprises a first set of pinion gears and a second set of pinion gears, the first set of pinion gears meshing with the first member of the second planetary gearset and the second set of pinion gears meshing with the reaction member of the second planetary gearset.

15. The multiple speed transmission of claim 11, wherein:
the first member of the first planetary gearset comprises an input to the first planetary gearset and the second member of the first planetary gearset comprises an output of the first planetary gearset;
the first member of the second planetary gearset comprises an input to the second planetary gearset and the second member of the second planetary gearset comprises an output of the second planetary gearset;
the output of the second planetary gearset is connected to the third member of the first planetary gearset to form a second input to the first planetary gearset.

16. A multiple speed transmission, comprising:
an input shaft;
an output shaft;
a first planetary gearset having a first member, a second member, and a third member, wherein the first planetary gearset is a simple planetary gearset;
a second planetary gearset having a first member, a second member, and a third member, wherein the second planetary gearset is a compound planetary gearset;
a plurality of interconnecting members each connected to at least one of the first and second planetary gearsets;
a first torque-transmitting mechanism selectively engageable to interconnect the input shaft with the first member of the first planetary gearset;
a second torque-transmitting mechanism selectively engageable to interconnect the input shaft with the third member of the first planetary gearset and the second member of the second planetary gearset;
a third torque-transmitting mechanism selectively engageable to interconnect the third member of the first planetary gearset and the second member of the second planetary gearset with a stationary member; and
a fourth torque-transmitting mechanism selectively engageable to interconnect the third member of the second planetary gearset with the stationary member;
the output shaft is continuously interconnected with the second member of the first planetary gearset and the first member of the second planetary gearset;
wherein the torque transmitting mechanisms are selectively engageable in combinations of at least two to establish at least seven forward speed ratios and at least three reverse speed ratios between the input shaft and the output shaft.

17. The multiple speed transmission of claim 16, wherein:
the first members of the first and second planetary gearsets comprise sun gears;
the second member of the first and second planetary gearsets comprise carrier members; and
the third members of the first and second planetary gearsets comprise ring gears.

18. The multiple speed transmission of claim 16, wherein:
the plurality of interconnecting members includes a first interconnecting member directly connected to the first member of the first planetary gearset;
the plurality of interconnecting members includes a second interconnecting member continuously interconnecting the third member of the first planetary gearset with the second member of the second planetary gearset; and
the plurality of interconnecting members includes a third interconnecting member directly connected to the third member of the second planetary gearset.

19. The multiple speed transmission of claim 16, wherein the second member of the second planetary gearset comprises a first set of pinion gears and a second set of pinion gears, the first set of pinion gears meshing with the first member of the second planetary gearset and the second set of pinion gears meshing with the reaction member of the second planetary gearset.

20. The multiple speed transmission of claim 16, further comprising a fifth torque-transmitting mechanism selectively engageable to interconnect the reaction member of the second planetary gearset with the stationary member.

\* \* \* \* \*